(12) United States Patent
Oohira

(10) Patent No.: US 8,471,977 B2
(45) Date of Patent: Jun. 25, 2013

(54) LIQUID CRYSTAL DISPLAY DEVICE

(75) Inventor: Eiji Oohira, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 13/296,261

(22) Filed: Nov. 15, 2011

(65) Prior Publication Data

US 2012/0127392 A1   May 24, 2012

(30) Foreign Application Priority Data

Nov. 19, 2010   (JP) .................. 2010-259035

(51) Int. Cl.
*G02F 1/133308*   (2006.01)

(52) U.S. Cl.
USPC .............. 349/58; 361/748; 361/749

(58) Field of Classification Search
None
See application file for complete search history.

(56) References Cited

U.S. PATENT DOCUMENTS

| 7,719,627 B2 * | 5/2010 | Okuda ........................ 349/58 |
| 2008/0068785 A1 | 3/2008 | Noguchi et al. |
| 2011/0002105 A1 * | 1/2011 | Miyazaki ................... 361/749 |

FOREIGN PATENT DOCUMENTS

| JP | 2004-117659 | 4/2004 |
| JP | 2008-70689 | 3/2008 |

* cited by examiner

*Primary Examiner* — Thanh-Nhan P Nguyen
(74) *Attorney, Agent, or Firm* — Antonelli, Terry, Stout & Kraus, LLP.

(57) ABSTRACT

A flexible printed circuit board is pulled out to the outside from an end portion of the bottom surface portion. A notch is formed on a tip end of the end portion of the bottom surface portion such that an inner edge of the notch and an outer edge which projects from the notch are contiguously formed. A side of the flexible printed circuit board is arranged so as to overlap the notch. The outer edge of the bottom surface portion which projects overlaps the flexible printed circuit board. An angle made by a straight line which connects an intersecting point between the side of the flexible printed circuit board and the inner edge and a point of inflection between the inner edge and the outer edge and the side of the flexible printed circuit board is set to 45° or less.

8 Claims, 4 Drawing Sheets

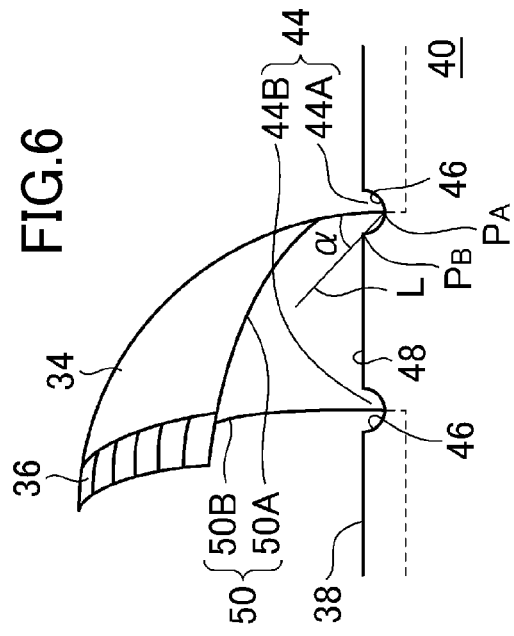
FIG.5
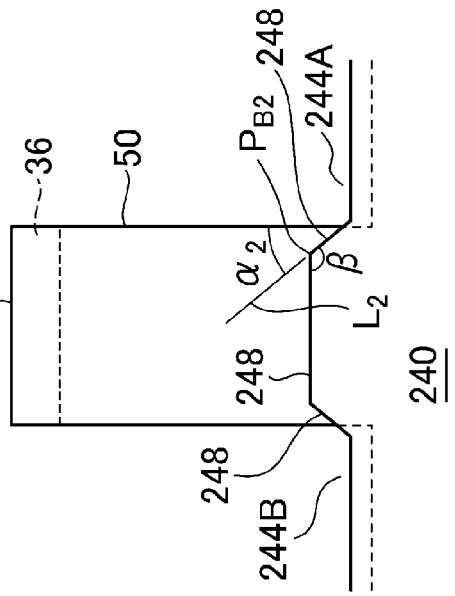
FIG.6
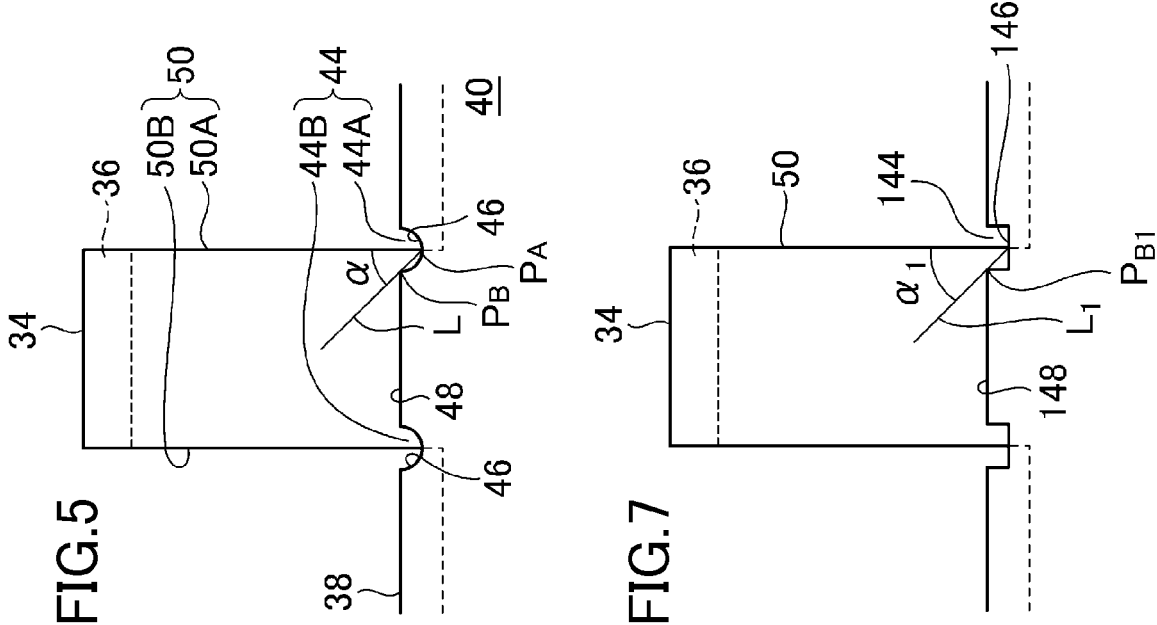
FIG.7
FIG.8

LIQUID CRYSTAL DISPLAY DEVICE

CROSS-REFERENCE TO RELATED APPLICATION

The present application claims priority from Japanese application JP2010-259035 filed on Nov. 19, 2010, the content of which is hereby incorporated by reference into this application.

BACKGROUND OF THE INVENTION

1. Field of the Invention

The present invention relates to a liquid crystal display device.

2. Description of the Related Art

A liquid crystal display device having the structure where a liquid crystal display panel is held by an inner frame and the inner frame is housed in an outer frame has been popularly used. A flexible printed circuit board is mounted on the liquid crystal display panel so as to enable the electrical connection with an external device (JP 2004-117659 A).

Conventionally, such a liquid crystal display device has a drawback that a flexible printed circuit board pulled out from a liquid crystal display panel is damaged when the flexible printed circuit board is brought into contact with an outer frame. JP 2004-117659 A discloses a technique which prevents a flexible printed circuit board from coming into contact with an outer frame by projecting an inner frame made of a resin. However, JP 2004-117659 A fails to propose a countermeasure which can prevent damage to a flexible printed circuit board when contact between an outer frame and the flexible printed circuit board is unavoidable in terms of structure.

SUMMARY OF THE INVENTION

It is an object of the present invention to provide a liquid crystal display device where damage to a flexible printed circuit board can be suppressed even when the flexible printed circuit board is brought into contact with an outer frame.

(1) According to a first aspect of the present invention, there is provided a liquid crystal display device which includes: a liquid crystal display panel having a display screen for displaying an image; a flexible printed circuit board which is mounted on the liquid crystal display panel; an inner frame which supports the liquid crystal display panel on a side opposite to the display screen; and an outer frame which houses the inner frame, wherein the outer frame includes a bottom surface portion which faces the inner frame in an opposed manner on a side opposite to the liquid crystal display panel, the flexible printed circuit board is bent, extends over a surface of the bottom surface portion on an inner frame side, and is pulled out to the outside from an end portion of the bottom surface portion, a notch is formed on a tip end of the end portion of the bottom surface portion such that an inner edge of the notch and an outer edge which projects from the notch are contiguously formed, a side of the flexible printed circuit board which extends in a direction that the flexible printed circuit board is pulled out is arranged so as to overlap the notch, the outer edge of the bottom surface portion which projects overlaps the flexible printed circuit board, and an angle made by a straight line which connects an intersecting point between the side of the flexible printed circuit board and the inner edge and a point of inflection between the inner edge and the outer edge and the side of the flexible printed circuit board is set to 45° or less outside the bottom surface portion.

According to the present invention, the side of the flexible printed circuit board overlaps the edge of the outer frame at an angle of 45° or less. Accordingly, even when the flexible printed circuit board is brought into contact with the outer frame, the flexible printed circuit board is hardly cut and hence, damage to the flexible printed circuit board can be suppressed.

(2) In the liquid crystal display device having the constitution described in (1), the inner edge and the outer edge may be connected with each other at the point of inflection at an obtuse angle on a bottom surface portion side.

(3) In the liquid crystal display device having the constitution described in (2), the notch may be formed of a round recessed portion, and the inner edge may draw a curve.

(4) In the liquid crystal display device having the constitution described in (2), the inner edge may extend straightly from the point of inflection.

(5) In the liquid crystal display device having the constitution described in (1), the notch may be formed of a quadrangular recessed portion, and the inner edge and the outer edge may be connected with each other at the point of inflection at a right angle.

(6) In the liquid crystal display device having the constitution described in any one of (1) to (5), the notch may include a first notch and a second notch, the outer edge may be positioned between the first notch and the second notch, the side of the flexible printed circuit board which extends in the direction that the flexible printed circuit board is pulled out may include a first side and a second side which are arranged opposite to each other, the first side may overlap the first notch, the second side may overlap the second notch, and the angle may be set to 45° or less with respect to both the first side and the second side.

(7) In the liquid crystal display device having the constitution described in any one of (1) to (6), the flexible printed circuit board may be sandwiched between the outer frame and the inner frame.

(8) In the liquid crystal display device having the constitution described in any one of (1) to (7), the outer frame may have a side wall portion which is raised from the bottom surface portion on the periphery of the inner frame while avoiding the notch and the outer edge which projects from the notch.

BRIEF DESCRIPTION OF THE DRAWINGS

FIG. 5 is a back view showing apart of a bottom surface portion of the outer frame in an enlarged manner;

FIG. 6 is a view for explaining advantageous effects acquired by the liquid crystal display device according to the embodiment;

FIG. 7 is a view for explaining a modification 1 of the embodiment; and

FIG. 8 is a view for explaining a modification 2 of the embodiment.

DETAILED DESCRIPTION OF THE INVENTION

An embodiment of the present invention is explained hereinafter in conjunction with drawings.

Figure 1:
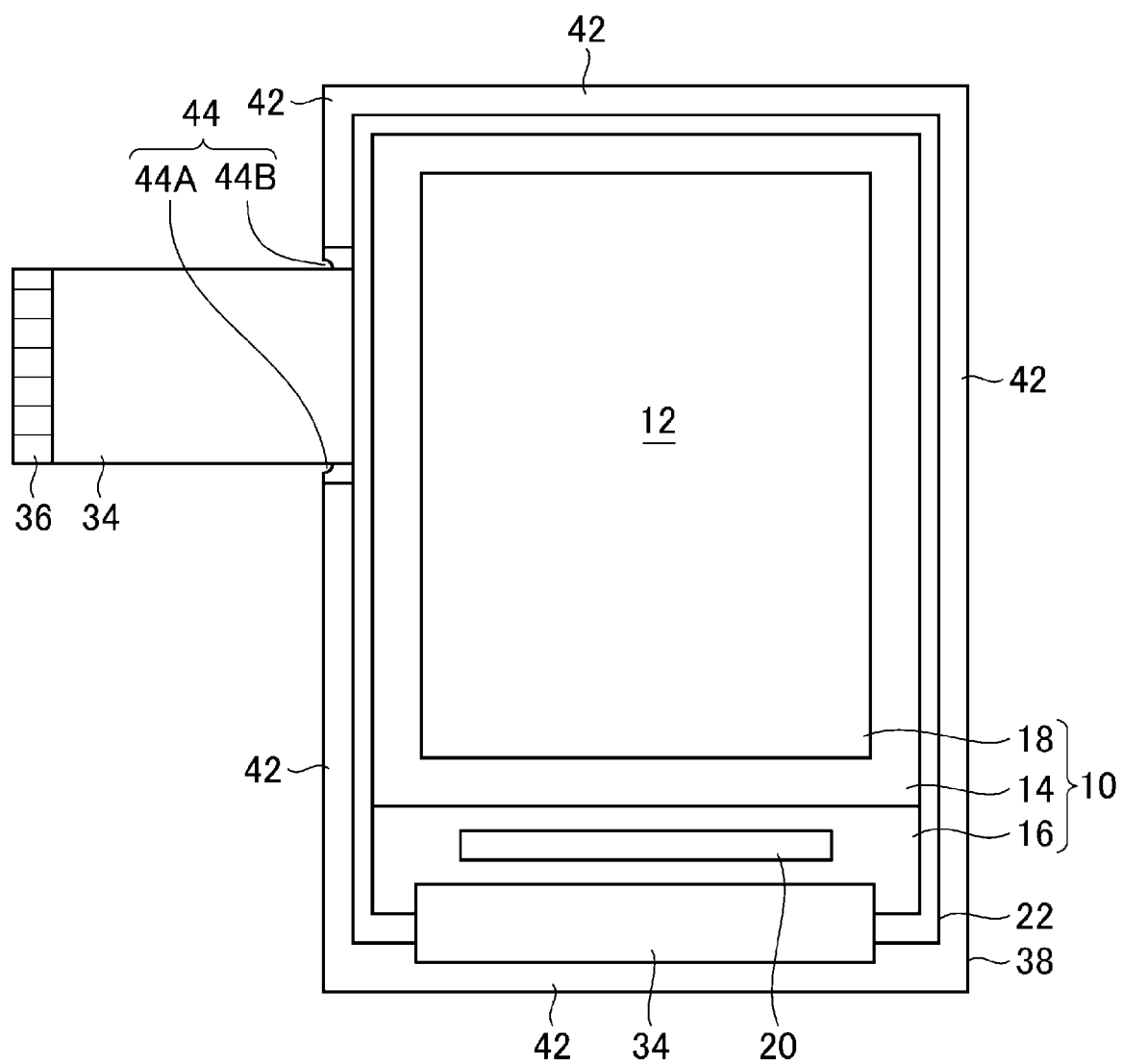
FIG. 1 is a plan view showing a liquid crystal display device according to an embodiment of the present invention.
Figure 2:
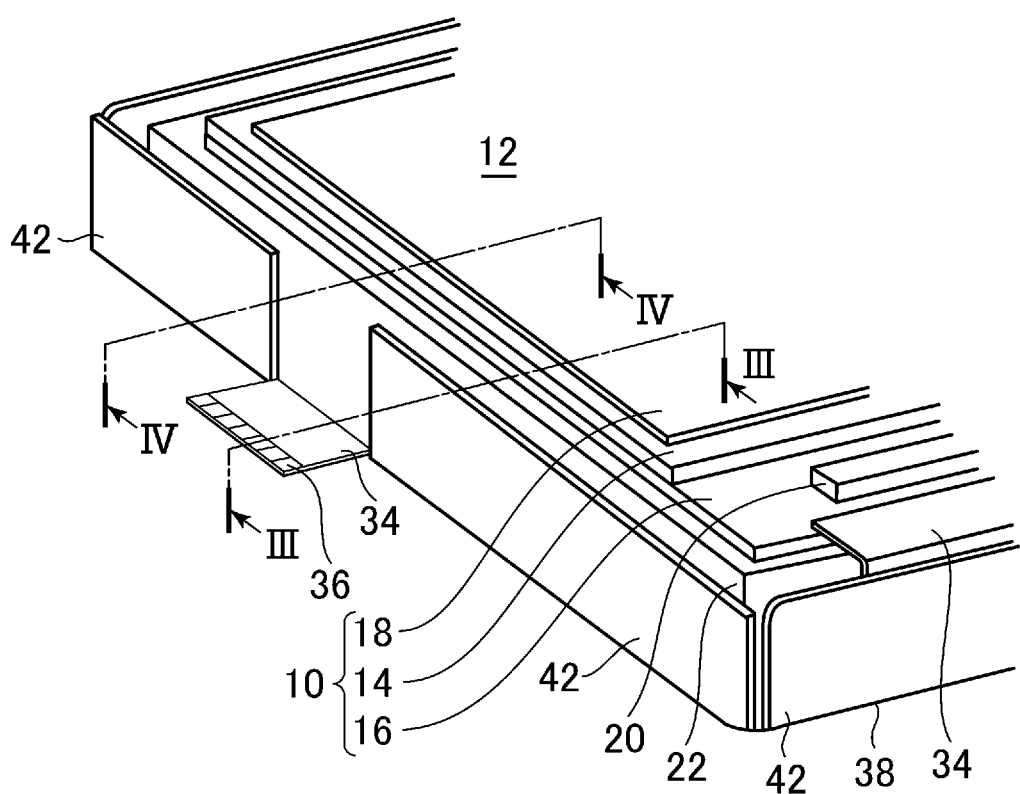
FIG. 2 is a perspective view of the liquid crystal display device shown in FIG. 1.
Figure 3:
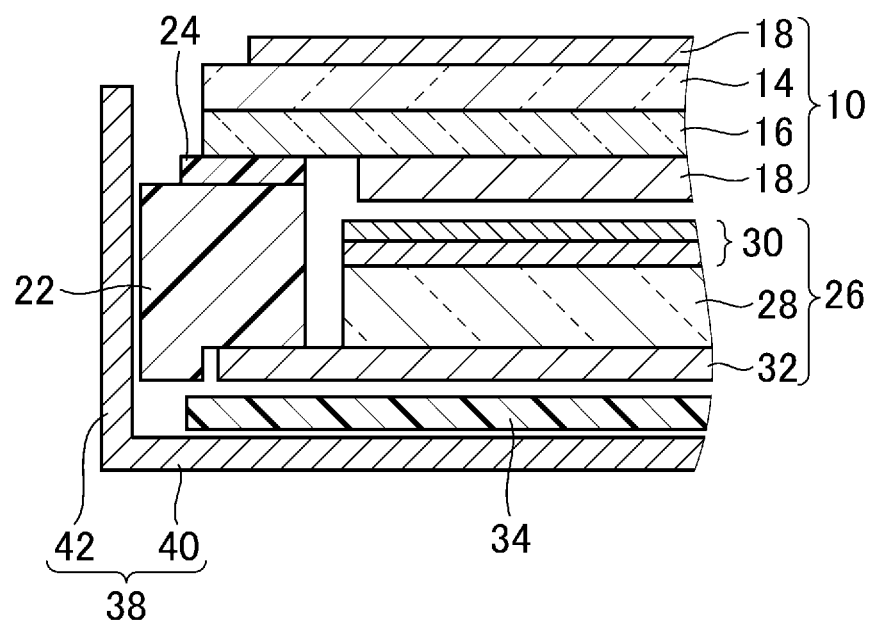
FIG. 3 is a cross-sectional view of the liquid crystal display device shown in FIG. 2 taken along a line III-III.
Figure 4:
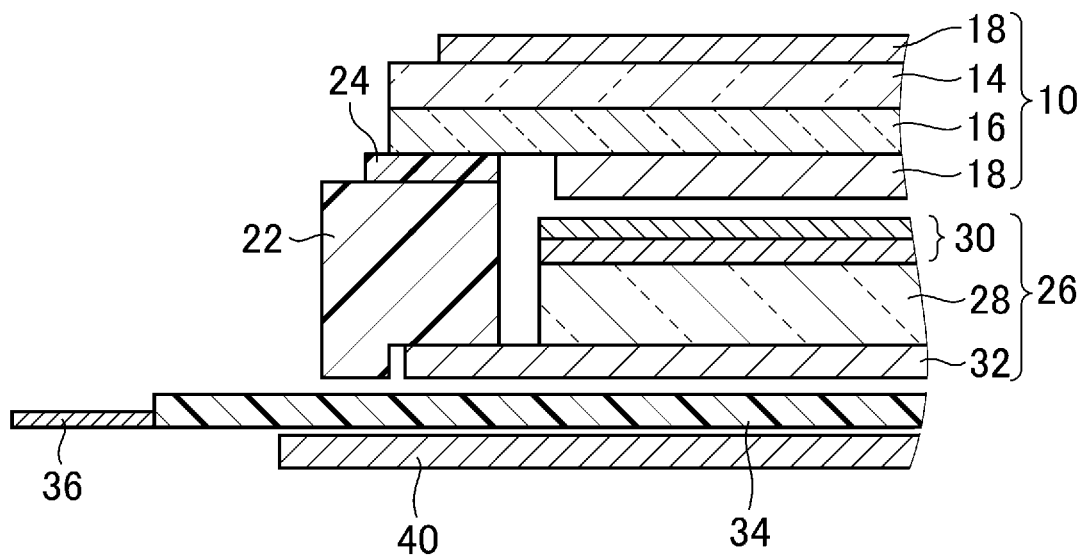
FIG. 4 is a cross-sectional view of the liquid crystal display device shown in FIG. 2 taken along a line IV-IV.

FIG. 1 is a plan view showing a liquid crystal display device according to an embodiment of the present invention. FIG. 2 is a perspective view of the liquid crystal display device shown in FIG. 1. FIG. 3 is a cross-sectional view of the liquid crystal display device shown in FIG. 2 taken along a line III-III. FIG. 4 is a cross-sectional view of the liquid crystal display device shown in FIG. 2 taken along a line IV-IV.

The liquid crystal display device includes a liquid crystal display panel 10. The liquid crystal display panel 10 has a display screen 12 for displaying an image. The liquid crystal display panel 10 includes a pair of substrates 14, 16 made of glass or the like and liquid crystal not shown in the drawing which is sandwiched between both substrates 14, 16. Polarizers 18 are laminated to respective surfaces of the pair of substrates 14, 16 opposite to each other (see FIG. 3 and FIG. 4). The pair of substrates 14, 16 is arranged in a displaced manner such that one substrate 16 projects from another substrate 14 (see FIG. 1 and FIG. 2). An integrated circuit chip 20 which incorporates a drive circuit for driving liquid crystal therein is mounted on a region of one substrate 16 projecting from another substrate 14 (see FIG. 1 and FIG. 2).

The liquid crystal display panel 10 is supported on an inner frame 22 formed by resin molding. The inner frame 22 supports an outer peripheral end portion of the liquid crystal display panel 10. The inner frame 22 supports the liquid crystal display panel 10 on a side opposite to the display screen 12. The liquid crystal display panel 10 and the inner frame 22 are fixed to each other by a pressure sensitive adhesive double-coated tape 24.

As shown in FIG. 3 and FIG. 4, the liquid crystal display device includes a backlight 26. A light guide plate 28 constitutes a part of the backlight 26, and an optical sheet 30 and a reflection sheet 32 are mounted on the light guide plate 28. The backlight 26 includes a light emitting part (for example, light emitting diode) constituting a light source not shown in the drawing. Light from the light emitting part is incident on an end surface of the light guide plate 28, and a surface of the light guide plate 28 which faces the liquid crystal display panel 10 in an opposed manner performs surface light emission.

As shown in FIGS. 1 and 2, a flexible printed circuit board 34 is mounted on the liquid crystal display panel 10. The flexible printed circuit board 34 includes a wiring pattern not shown in the drawing, and is electrically connected with the liquid crystal display panel 10. The flexible printed circuit board 34 is pulled out from the liquid crystal display panel 10 and is bent as shown in FIG. 2, and is arranged to pass below the inner frame 22 (a side opposite to the liquid crystal display panel 10) as shown in FIG. 3 and FIG. 4. The flexible printed circuit board 34 has an interface terminal 36 for establishing the electrical connection with an external device.

The inner frame 22 is housed in an outer frame 38. The outer frame 38 includes a bottom surface portion 40 which faces the inner frame 22 on a side opposite to the liquid crystal display panel 10 (see FIG. 3, FIG. 4). The outer frame 38 also includes a side wall portion 42 which is raised from the bottom surface portion 40 around the inner frame 22. The side wall portion 42 is formed on the bottom surface portion 40 except for a portion of the bottom surface portion 40 (see FIG. 2). The flexible printed circuit board 34 is pulled out from a position where the side wall portion 42 of the outer frame 38 is not formed, and the interface terminal 36 is positioned at a tip end of the flexible printed circuit board 34.

FIG. 5 is a back view showing a part of the bottom surface portion 40 of the outer frame 30 in an enlarged manner. Notches 44 are formed on the tip end of the end portion (the portion where the side wall portion 42 is not formed) of the bottom surface portion 40 of the outer frame 38. In the example shown in FIG. 5, the notches 44 are formed of a round recessed portion, and an inner edge 46 of the notch 44 draws a curve. The notches 44 are formed of a first notch 44A and the second notch 44B.

The inner edges 46 of the notches 44 and an outer edge 48 which projects from the notches 44 are contiguously formed. The outer edge 48 is positioned between the first notch 44A and the second notch 44B. The side wall portion 42 is formed in a state where the side wall portion 42 avoids the notches 44 and the outer edge 48 which projects from the notches 44 (see FIG. 1).

The flexible printed circuit board 34 extends, as shown in FIG. 4, on a surface of the bottom surface portion 40 on an inner frame 22 side. The flexible printed circuit board 34 is sandwiched between the outer frame 38 and the inner frame 22. The flexible printed circuit board 34 is pulled out to the outside from the end portion of the bottom surface portion 40.

As shown in FIG. 5, sides 50 of the flexible printed circuit board 34 which extend in a direction that the flexible printed circuit board 34 is pulled out are arranged so as to overlap the notches 44. The sides 50 of the flexible printed circuit board 34 which extends in the direction that the flexible printed circuit board 34 is pulled out include a first side 50A and a second side 50B which are arranged opposite to each other. The first side 50A overlaps the first notch 44A. The second side 50B overlaps the second notch 44B. The projecting outer edge 48 of the bottom surface portion 40 (the edge contiguously formed with the first notch 44A and the second notch 44B) overlaps the flexible printed circuit board 34.

In FIG. 5, a straight line L which connects an intersecting point $P_A$ between the side 50 of the flexible printed circuit board 34 and the inner edge 46 and a point of inflection $P_B$ between the inner edge 46 and the outer edge 48 is indicated. An angle α made by the straight line L and the side 50 of the flexible printed circuit board 34 is set to 45° or less outside the bottom surface portion 40 (or on a side of the side 50).

As shown in FIG. 6, the intersecting point $P_A$ between the side 50 of the flexible printed circuit board 34 and the inner edge 46 is a point where a shearing stress is generated in the flexible printed circuit board 34 when the flexible printed circuit board 34 is pulled obliquely so that a torsional stress is generated. The point of inflexion $P_B$ between the inner edge 46 and the outer edge 48 is a point where the bottom surface portion 40 is brought into contact with the flexible printed circuit board 34 when the flexible printed circuit board 34 is pulled obliquely so that a torsional stress is generated. That is, a shearing force acts on the flexible printed circuit board 34 along the straight line L. The shearing force acts at a shallow angle (45° or less). Accordingly, the flexible printed circuit board 34 is hardly cut and hence, damage to the flexible printed circuit board 34 can be suppressed.

[Modification 1]

FIG. 7 is a view for explaining the modification 1 of the embodiment according to the present invention. In this modification, an inner edge 146 of a notch 144 is formed of an angular corner (for example, a right-angled corner). That is, the notch 144 is formed of a quadrangular recessed portion. Further, the inner edge 146 extends in a straight manner from a point of inflexion $P_{B1}$. To be more specific, the inner edge 146 and an outer edge 148 are connected at a right angle at the point of inflection $P_{B1}$. In other words, the direction along which the inner edge 146 extends from the point of inflection $P_{B1}$ is parallel to a side 50 of a flexible printed circuit board 34. Also in this modification, provided that an angle $α_1$ made by the straight line $L_1$ and the side 50 of the flexible printed circuit board 34 is set to 45° or less, advantageous effects substantially equal to the advantageous effects of the above-mentioned embodiment can be obtained.

[Modification 2]

FIG. 8 is a view for explaining modification 2 of the embodiment according to the present invention. In this modification, inner edges 246 and an outer edge 248 are connected with each other at a point of inflection $P_{B2}$ between these edges at an obtuse angle β on a bottom surface portion 240 side. A tip end of a projecting portion between a first notch 244A and a second notch 244B forms an outer edge 248 which overlaps a flexible printed circuit board 34. Also in this modification, provided that an angle $α_2$ made by a straight line $L_2$ and the side 50 of the flexible printed circuit board 34 is set to 45° or less, advantageous effects equal to the advantageous effects of the above-mentioned embodiment can be obtained.

The present invention is not limited to the above-mentioned embodiment and modifications, and various other modifications are conceivable. For example, the constitutions which are explained in conjunction with the embodiment and the modifications can be replaced with the substantially same constitution, the constitution which can acquire the substantially same manner of operation and advantageous effects or the constitution which can achieve the same object.

What is claimed is:

1. A liquid crystal display device comprising:
   a liquid crystal display panel having a display screen for displaying an image;
   a flexible printed circuit board which is mounted on the liquid crystal display panel;
   an inner frame which supports the liquid crystal display panel on a side opposite to the display screen; and
   an outer frame which houses the inner frame, wherein
   the outer frame includes a bottom surface portion which faces the inner frame in an opposed manner on a side opposite to the liquid crystal display panel,
   the flexible printed circuit board is bent, extends over a surface of the bottom surface portion on an inner frame side, and is pulled out to the outside from an end portion of the bottom surface portion,
   a notch is formed on a tip end of the end portion of the bottom surface portion such that an inner edge of the notch and an outer edge which projects from the notch are contiguously formed,
   a side of the flexible printed circuit board which extends in a direction that the flexible printed circuit board is pulled out is arranged so as to overlap the notch,
   the outer edge of the bottom surface portion overlaps the flexible printed circuit board, and
   an angle made by a straight line which connects an intersecting point between the side of the flexible printed circuit board and the inner edge and a point of inflection between the inner edge and the outer edge and the side of the flexible printed circuit board is set to 45° or less outside the bottom surface portion.

2. The liquid crystal display device according to claim 1, wherein the inner edge and the outer edge are connected with each other at the point of inflection at an obtuse angle on a bottom surface portion side.

3. The liquid crystal display device according to claim 2, wherein the notch is formed of a round recessed portion, and the inner edge draws a curve.

4. The liquid crystal display device according to claim 2, wherein the inner edge extends straightly from the point of inflection.

5. The liquid crystal display device according to claim 1, wherein the notch is formed of a quadrangular recessed portion, and the inner edge and the outer edge are connected with each other at the point of inflection at a right angle.

6. The liquid crystal display device according to claim 1, wherein
   the notch includes a first notch and a second notch, the outer edge is positioned between the first notch and the second notch,
   the side of the flexible printed circuit board which extends in the direction that the flexible printed circuit board is pulled out includes a first side and a second side which are arranged opposite to each other,
   the first side overlaps the first notch,
   the second side overlaps the second notch, and
   the angle is set to 45° or less with respect to both the first side and the second side.

7. The liquid crystal display device according to claim 1, wherein the flexible printed circuit board is sandwiched between the outer frame and the inner frame.

8. The liquid crystal display device according to claim 1, wherein the outer frame has a side wall portion which is raised from the bottom surface portion on the periphery of the inner frame while avoiding the notch and the outer edge which projects from the notch.

* * * * *